United States Patent [19]

Knapp

[11] 4,120,733

[45] Oct. 17, 1978

[54] LEAD-FREE GLAZE FOR ALUMINA BODIES

[75] Inventor: Randy O. Knapp, Cottam, Canada

[73] Assignee: Champion Spark Plug Company, Toledo, Ohio

[21] Appl. No.: 856,225

[22] Filed: Dec. 1, 1977

[51] Int. Cl.² ............................................. C03C 5/02
[52] U.S. Cl. ........................................ 106/48; 106/54
[58] Field of Search ............................. 106/48, 54, 46

[56] References Cited

U.S. PATENT DOCUMENTS 3,640,738  2/1972  Detweiler .............................. 106/54
3,927,238  12/1975  DiMarcello ........................ 106/48 X

OTHER PUBLICATIONS

Parmelee, C. W. – *Ceramic Glazes* (1951) Pub. by Industrial Publications, Inc., Chicago, pp. 215–216, 220.
Fedrowitz, W. et al. – "Glasses for Indium Oxide Resistors" – IBM Technical Disclosure Bulletin 9(11) Apr. 1967, pp. 106–154.

*Primary Examiner*—Helen McCarthy
*Attorney, Agent, or Firm*—John C. Purdue

[57] ABSTRACT

A high-silica ceramic glaze, having a low coefficient of thermal expansion, suitable for application to alumina bodies, is disclosed. The glaze consists essentially, by weight percent, of 48 to 54 percent $SiO_2$, from 7 to 11 percent $Al_2O_3$, from 16½ to 20 percent $B_2O_3$, from 11 to 14 percent BaO, from 2 to 3 percent CaO, from 2 to 2½ percent ZnO, from 4¼ to 5¼ percent $Na_2O$, and from 0.4 to 1 percent $K_2O$. $Li_2O$ and MgO to the extent of up to about ¼ percent and 1 percent, respectively, can also be tolerated, as can minor amounts of other impurities.

6 Claims, No Drawings

LEAD-FREE GLAZE FOR ALUMINA BODIES

BACKGROUND OF THE INVENTION

Glazes are continuous coatings which are usually prepared from fused silicate mixtures and are fusion-bonded to ceramic substrates. A glaze is used on a ceramic substrate to serve one or more of the following purposes: (1) to render the substrate impermeable to liquids and gases, (2) for aesthetic reasons, including covering blemishes and providing decorative effects, (3) to provide protective coatings, and (4) to increase strength.

The exterior portion of a spark plug insulator is exposed to dirt and grease which may result in the formation of an electrically conducting surface and premature failure of the spark plug. Alumina insulator bodies of spark plugs are usually glazed in order to minimize dirt and grease build-up, and to increase the strength and imperviousness of the surface. Depending on the particular properties desired, the glaze can be modified to change the maturing temperature, to add color or to modify the coefficient of thermal expansion.

Glazes applied to alumina substrates must have a low thermal coefficient of expansion, similar to that of the alumina substrate, to avoid undue stresses which can cause spalling, chipping, cracking or crazing of the glaze; from 6 to 7 micro inches per inch per ° C. is a typical range of coefficient of thermal expansion for alumina bodies. A glaze with a low coefficient of thermal expansion also strengthens the insulator by inducing compressive stresses at the surface of the glaze-insulator composite. Because glazes involve highly complex multi-component systems, it is difficult to predict the effect of varying or substituting chemical compounds in a glaze formulation, even though general properties of some of the individual components are known. Furthermore, because a glaze is not homogeneous, that is, it may contain one or more dispersed undissolved phases, the ultimate components shown by chemical analysis do not describe a glaze such that the properties are easily predictable.

Because the oxides and carbonates of lead enter into combination with silica and boric acid, lead finds extensive use in glazes. The addition of lead to a glaze lowers the coefficient of thermal expansion and lowers the modulus of elasticity; lead also decreases melt viscosity, reduces the danger of devitrification, broadens the maturing range, and lowers the surface tension of molten glazes, helping to homogenize the glaze and form a defect-free surface.

However, the use of lead compounds in glazes has numerous disadvantages, including a decrease in the abrasion resistance of the glaze, and volatility when fired above cone 6 or 7.

A more serious problem is the toxic nature of the lead compounds used in glazes. Occupational exposure to lead compounds may provide an opportunity for ingestion and subsequent lead extraction by digestive acids. The danger from lead poisoning is amplified because the lead tends to accumulate in the central nervous system of the human body. Increased concern and knowledge relating to environmental health and safety have made it increasingly desirable to substitute a lead-free glaze for lead-containing glazes presently in use. In order to be suitable, lead-free glazes must be non-toxic and contain ingredients which are readily available at a reasonable cost. Transparent glazes over underglaze decorations, are usually preferred.

A lead-free glaze suitable for application to high alumina ceramics has been developed, and is disclosed and claimed in U.S. application Ser. No. 817,194, filed July 20, 1977. This glaze consists essentially of from 50 to 54 percent* $SiO_2$, from 5 to 8 percent $Al_2O_3$, from 6 to 12 percent by weight $B_2O_3$, from 4 to 6 percent CaO, from 2 to 8 percent MgO, from 2 to 15 percent by weight BaO, from 5 to 8 percent SrO, from 1 to 2 percent ZnO, and from 4 to 6 percent of a mixture of $Na_2O$, $K_2O$ and $Li_2O$.

*The terms "percent" and "parts" are used herein and in the appended claims to refer to percent and parts by weight, unless otherwise indicated.

SUMMARY

This invention relates to lead-free glazes useful for application to alumina substrates. The glaze consists essentially of 48 to 54 percent $SiO_2$, from 7 to 11 percent $Al_2O_3$, from 16½ to 20 percent $B_2O_3$, from 11 to 14 percent BaO, from 2 to 3 percent CaO, from 2 to 2½ percent ZnO, from 4¼ to 5¼ percent $Na_2O$, and from 0.4 to 1 percent $K_2O$. $Li_2O$ and MgO to the extent of up to about ¼ percent and 1 percent, respectively, can also be tolerated, and minor amounts of other impurities, e.g., $Fe_2O_3$, and $TiO_2$ or a mixture are sometimes present as unnecessary, but harmless ingredients. The lead-free glaze of the present invention differs in chemical composition from that of application Ser. No. 817,194 and, as a consequence of the differences, matures at temperatures from 80° to 100° F. lower, when fired under the same conditions, than does the glaze of said application. The glaze of the subject invention, therefore, constitutes an improvement over that of said application, because the lower firing temperatures minimize deterioration of kilns and kiln furniture, and reduce the fuel requirements for the production of glazed, alumina bodies.

It is an object of the invention to provide lead-free glazes.

It is a further object of this invention to provide lead-free glazes having a coefficient of thermal expansion similar to that of high-alumina substrates.

Other objects and benefits of this invention will be apparent from the following disclosure.

EXAMPLE I

A sintered high alumina substrate, containing about 90 percent by weight $Al_2O_3$, 7.2 percent by weight $SiO_2$, 1.5 percent by weight CaO, and 0.7 percent by weight MgO, was coated with a lead-free glaze slurry having the following composition*:

| Oxide | Percent |
| --- | --- |
| $SiO_2$ | 50.2 |
| $Al_2O_3$ | 8.5 |
| $B_2O_3$ | 18.5 |
| CaO | 2.2 |
| $Na_2O$ | 4.5 |
| $K_2O$ | 0.5 |
| $Li_2O$ | 0.2 |
| ZnO | 2.0 |
| BaO | 12.8 |
| SrO | 0.5 |
| $Fe_2O_3$, $TiO_2$, MgO | 0.1 |

*Formulae reported herein, and in the appended claims, represent fired compositions, disregarding volatilization, if any, of oxide ingredients during firing.

Alumina bodies coated with a glaze slurry of the foregoing composition have been fired at temperatures from 1900° F. to 2200° F. to produce smooth, uniform glazes of high gloss and good strength. There was no evidence in any case of crazing or devitrification in the glaze. The average strength increase attributable to the fired glaze was about 40 to 45 percent.

On an empirical molecular formula basis, the glaze composition set forth in Example I is shown in the Table below:

| CHEMICAL ANALYSIS | | Weight* | Molecular | MOLES (Wt./Molecular) | "Normalized" Mole |
|---|---|---|---|---|---|
| Oxide | Symbol | % | Weight | Wt.) | Fraction |
| $SiO_2$ | $RO_2$ | 50.18 | 60.1 | 0.835 | 3.52 |
| $Al_2O_3$ | $R_2O_3$ | 8.52 | 102.0 | 0.084 | 0.35 |
| $B_2O_3$ | $R_2O_3$ | 18.46 | 69.6 | 0.265 | 1.12 |
| CaO | RO | 2.22 | 56.1 | 0.040 | 0.17 |
| BaO | RO | 12.84 | 153.3 | 0.084 | 0.35 |
| SrO | RO | 0.54 | 103.6 | 0.005 | 0.02 |
| ZnO | RO | 2.02 | 81.4 | 0.025 | 0.10 |
| $Na_2O$ | $R_2O$ | 4.47 | 62.0 | 0.072 | 0.30 |
| $K_2O$ | $R_2O$ | 0.47 | 94.2 | 0.005 | 0.02 |
| $Li_2O$ | $R_2O$ | 0.19 | 29.9 | 0.006 | 0.03 |
| Minor impurities, $Fe_2O_3$, $TiO_2$ and MgO | | Trace | | | |

*Weight percentages are reported to two points after the decimal for completeness, and not as an indication of criticality.

EXAMPLES II-VI

The above procedure was repeated with similar results for glazes of the following compositions:

| | WEIGHT PERCENT | | | | |
|---|---|---|---|---|---|
| Oxide | II | III | IV | V | VI |
| $SiO_2$ | 50.1 | 49.9 | 48.3 | 48.6 | 51.9 |
| $Al_2O_3$ | 7.0 | 7.1 | 8.5 | 8.8 | 10.8 |
| $B_2O_3$ | 19.1 | 19.3 | 20.0 | 19.3 | 16.6 |
| CaO | 2.3 | 2.3 | 2.9 | 2.9 | 2.1 |
| BaO | 13.3 | 13.4 | 12.2 | 12.2 | 11.6 |
| SrO | 0.5 | 0.5 | 0.5 | 0.5 | 0.5 |
| ZnO | 2.0 | 2.1 | 2.0 | 2.1 | 2.0 |
| $Na_2O$ | 4.7 | 4.7 | 4.6 | 4.6 | 4.0 |
| $K_2O$ | 0.5 | 0.5 | 0.4 | 0.5 | 0.4 |
| $Li_2O$ | 0.2 | 0.2 | 0.2 | 0.2 | 0.2 |
| MgO | 0.3 | | | 0.3 | 0.2 | 0.2 |
| Minor impurities, $Fe_2O_3$ and $TiO_2$ | Trace | Trace | 0.1 | 0.1 | 0.1 |

As previously stated, the ultimate composition of a glaze is highly complex. The compositions described above contain more than a dozen oxides. Even though it might not be possible to predict quantitatively the behavior of a glaze, it is desirable that some degree of comprehension and control be achieved.

The raw materials of glazes are almost always oxides or compounds that can be expressed as oxides, thus enabling the components to be described in terms of phase compositions having known characteristics. Because of this, glaze ceramists commonly use a system of expressing oxide compositions in terms of molar proportions, i.e., molecular equivalents. By means of molecular equivalents, an empirical oxide formula can be calculated for each glaze composition.

For purposes of arriving at an empirical molecular formula, all oxides are classified as either basic, "neutral" (amphoteric), or acid. The glaze oxides which are classified as bases, that is, the alkali metal and alkaline earth oxides, are designated as "$R_2O$" and "RO" respectively. Moles of "neutral" or amphoteric oxides are designated as "$R_2O_3$" and moles of acid oxides are designated as $RO_2$.

In establishing the empirical formula for a glaze, the formula is "normalized" so that the sum of $R_2O$ and RO is brought to unity. In Example I, the sum of RO plus $R_2O$ equals 0.237 moles; dividing each of the moles obtained by the total moles of RO and $R_2O$ establishes the empirical formula for the glaze given in the last column as "normalized mole fraction". By means of the empirical formula, the calculation of "batch weights" or the calculation of a glaze from a given formula is simplified, especially if it is desired to formulate the glaze from compounds other than oxides, such as for example, carbonates. Comparison of glaze formulations is thereby greatly simplified.

In general, the oxides which are present in the instant invention possess the following properties. The $SiO_2$ is macroscopically miscible at all temperatures. Control of the amount of silica is important, since if the silica is too high, the glaze becomes excessively refractory; if the silica is too low, the glaze becomes too soluble and, therefore, unstable. The amount and character of the other elements present greatly modifies the effect of the silica present. The alumina increases the viscosity and retards macrocrystalline growth. High viscosity is undesirable in a glaze because it prevents healing of pinholes, scratches, and other minor surface flaws. The alkalies are strong fluxes and increase the fluidity of the molten glaze. Increasing the amount of alkali compounds present in the glaze increases the coefficient of thermal expansion, and has a direct bearing upon crazing of the glaze. The alkaline earths also act as vigorous fluxes in a glaze composition. For example, CaO acts as a flux at temperatures of cone 4 and above; excess calcia can cause refractoriness and devitrification, leading to a low-gloss matte texture, possibly as the result of formation of anorthite ($CaO.SiO_2$). Magnesia acts as a vigorous flux at higher temperatures, and lowers the coefficient of thermal expansion to a much greater degree than other bases. The oxides of strontium, barium and zinc also act as fluxes.

The above Examples and experimental test results on a series of lead-free glazes indicate that the normalized molecular formula should contain from about 0.33 to 0.35 mole of $R_2O$, about 0.10 mole of ZnO and from 1.37 to 1.54 moles $R_2O_3$, and that from 1.07 to 1.14 moles of the $R_2O_3$ should be $B_2O_3$. The results also indicate that the relationship of the remaining moles of RO (0.54 to 0.57 mole of MgO, CaO, SrO and BaO) is critical, and of these moles of RO, from 0.31 to 0.36 mole should be BaO. Substantial variation of the ratio can cause devitrification and crazing of the glaze.

What I claim is:

1. A lead-free ceramic glaze for application to sintered high alumina substrates and maturing at temperatures from 1900° to 2200° F. consisting essentially of from 48 to 54 weight percent $SiO_2$, from 7 to 11 percent $Al_2O_3$, from 16½ to 20 percent $B_2O_3$, from 11 to 14 percent BaO, from 2 to 3 percent CaO, from 2 to 2½ percent ZnO, from 4¼ to 5¼ percent $Na_2O$, and from 0.4 to 1 percent $K_2O$.

2. A ceramic glaze as claimed in claim 1 consisting essentially of 50 percent $SiO_2$, 8½ percent $Al_2O_3$, 18½ percent $B_2O_3$, percent CaO, 4½ percent $Na_2O$, ½ percent $K_2O$, ¼ percent $Li_2O$, 2 percent ZnO, 12¾ percent BaO and ½ percent SrO.

3. A ceramic glazed as claimed in claim 1 wherein the normalized molecular formula contains from about 0.33 to 0.35 mole of $R_2O$, about 0.1 mole of ZnO and from 1.37 to 1.54 moles of $R_2O_3$.

4. A ceramic glaze as claimed in claim 3 wherein from 1.07 to 1.14 moles of the $R_2O_3$ in the normalized molecular formula for the glaze is $B_2O_3$.

5. A ceramic glaze as claimed in claim 4 wherein the RO in the normalized molecular formula is from substantially 0.54 to 0.57 mole.

6. A ceramic glaze as claimed in claim 5 wherein BaO constitutes from 0.31 to 0.36 mole of the RO in the normalized molecular formula for the glaze.

* * * * *

UNITED STATES PATENT AND TRADEMARK OFFICE
CERTIFICATE OF CORRECTION

PATENT NO. : 4,120,733

DATED : Oct. 17, 1978

INVENTOR(S) : Randy O. Knapp

It is certified that error appears in the above-identified patent and that said Letters Patent are hereby corrected as shown below:

Column 5, line 16, before "percent" (second occurrence) insert - 2-1/4 - .

Signed and Sealed this

Tenth Day of February 1981

[SEAL]

Attest:

Attesting Officer

RENE D. TEGTMEYER

Acting Commissioner of Patents and Trademarks